Patented Jan. 4, 1949

2,457,823

UNITED STATES PATENT OFFICE 2,457,823

PRODUCTION OF PYRAZOLONE AZO DYES

John David Kendall and Douglas James Fry, Ilford, England, assignors to Ilford Limited, Ilford, Essex, England, a British company No Drawing. Application November 29, 1945, Serial No. 631,792. In Great Britain December 1, 1944

6 Claims. (Cl. 260—159)

This invention relates to the production of azo dyestuffs.

When a compound containing a reactive methylene group, i. e. a compound which may be represented by the general formula $R_1$—$CH_2$—$R_2$ (where $R_1$ and $R_2$ are organic groupings at least one of which contains a group adjacent to the $CH_2$ group which renders the $CH_2$ group reactive) and which is capable of forming a sodium derivative, is converted to a mono alkali, e. g. sodium, salt and reacted with a monohalogenated acetic acid or ester, i. e., a compound of the formula $XCH_2.COOR_3$ (where X is a halogen atom and $R_3$ is a hydrogen or hydrocarbon group), a reaction takes place according to the following equation:

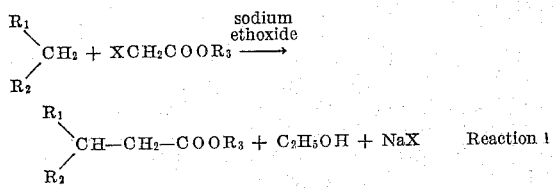

Reaction 1

In this equation the formation of the sodium derivative is effected in situ by carrying out the reaction in the presence of sodium ethoxide.

It has now been discovered that when a compound of the formula

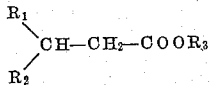

is reacted in the presence of strong alkali with at least two molecular equivalents of a diazonium compound (e. g. a compound of the formula $R_4N_2Cl$, where $R_4$ is an aryl residue), reaction takes place with the elimination of one of the groups $R_1$ and $R_2$ and the formation of an azo dyestuff, thus:

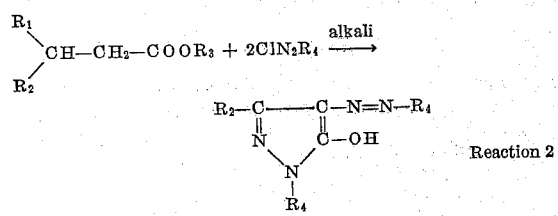

Reaction 2

In these formulae it has been assumed that in reaction 2 the group $R_1$ is eliminated. Actually, of course, $R_1$ and $R_2$ are not distinguished in reaction 1 and the question of which group is removed depends on the actual nature of the groups $R_1$ and $R_2$ and on the particular conditions of reaction.

The groups $R_1$ and $R_2$ may be, for example, —CN, —COOR, —COR or —CO.NHR where R is hydrogen or a hydrocarbon group.

According to the present invention, therefore, azo dyestuffs are prepared by reacting a diazonium compound with the condensation product of a mono alkali-metal derivative of a compound containing a reactive methylene group with a monohalogenated acetic acid or ester, the said reaction being effected in strong alkaline solution and the said diazonium compound being present in a proportion of at least two molecular equivalents per molecular equivalent of the condensation product.

The term "molecular equivalent" is to be understood as meaning molecular equivalent per diazo group. Thus where the diazonium compound contains more than one reactive diazo grouping, the quantity used should be correspondingly decreased. For example, a diazonium compound containing two diazo groupings should be used in a proportion of at least one molecular weight per molecular weight of the condensation product, and so on.

Examples of reagents suitable for producing the initial condensation product are, as the reactive methylene compound, compounds such as malonic ester, acetoacetic ester, cyanacetic ester, acetyl acetone, or a derivative such as aceto-acetanilide in which the reactive methylene group is still present and, as the monohalogenated acetic acid or ester, chloracetic acid or chloracetic ethyl ester. The condensation should be effected with the reactive methylene compound in the form of its mono alkali-metal salt, and this can be achieved by effecting the condensation in the presence of an alkali-metal ethoxide, e. g. sodium ethoxide. As examples of the products obtained using chloracetic ethyl ester, there are:

(a) From malonic ester the compound

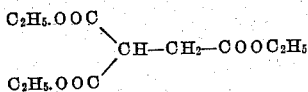

(b) From acetoacetic ethyl ester the compound

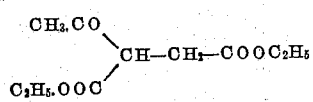

(c) From cyanacetic ethyl ester the compound

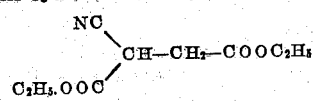

(d) From acetyl acetone the compound

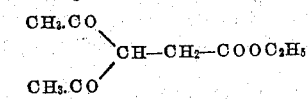

(e) From acetoacetanilide the compound

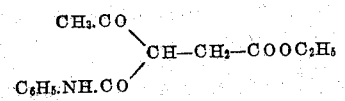

To produce the azo dyestuff in accordance with this invention, the condensation product is treated with the diazonium compound, in the presence of strong alkali, the reaction solution preferably being kept cold. Suitable strong alkalis are caustic soda, caustic potash and sodium ethoxide, and the like. Reaction then takes place at the CH grouping, one of the two substituents attached thereto in the original reactive methylene compound being displaced and the compound ring-closes. For example, in the case of the products of (a) and (d) above, one of the two similar groupings attached to the CH grouping is displaced; in the case of the product of (b) and (e) a CH₃CO grouping is displaced, and in the case of the product of (c) a COOC₂H₅ grouping is displaced. The azo dyestuff thus formed is readily separated from the reaction mixture.

Typical azo dyestuffs which may be produced by the process of this invention, using benzene diazonium chloride as a typical diazonium compound, are:

From the product of (a) and (b) the compound

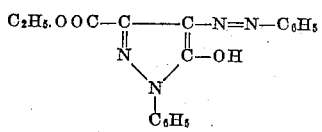

From the product of (c) the compound

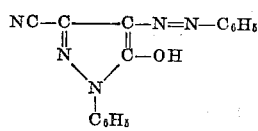

From the product of (d) the compound

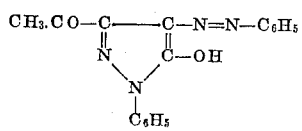

From the product of (e) the compound

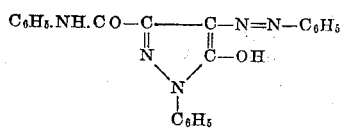

Where a tetrazotised diamine is employed the products apparently conform to the formula:

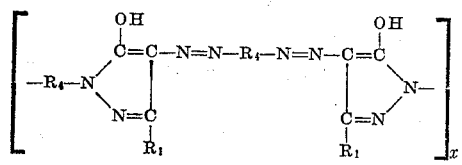

where $R_4$ is a divalent aromatic residue, $R_1$ has the meaning assigned to it above, and $x$ is a positive integer.

The products are sometimes slightly contaminated with pyrazole-5-ones, the specific production of which is described in co-pending application Serial Number 631,791 filed November 29, 1945, but are usually less freely soluble in alkali than the pyrazole-5-ones and can thus be readily separated.

Whilst benzene diazonium chloride has been instanced above as a suitable diazonium compound, all the well known diazonium compounds can be similarly employed. As representative examples of suitable diazonium compounds there may be mentioned the diazonium chlorides derived from the following amines: aniline, toluidine, xylidine, naphthionic acid, α-naphthylamine, β-naphthylamine, p-aminobenzyl dimethylamine, m-aminophenyl dimethylamine, m-nitraniline, p-aminophenol, sulphanilic acid, the various amino naphthol sulphonic acids, amino azo benzene and its sulphonic acids, and diamines, e. g. benzidine, tolidines, p.p-diamino stilbene, p.p-diamino diphenylamine, p.p-diamino carbazole, p.p-diamino fluorene, p.p-diamino azobenzene, p-phenylene diamine, 1:4 and 1:5 diamino naphthalenes, dehydrothio p-toluidine and its sulphonic acid, and amino anthraquinones, e. g. 1.5-diamino anthraquinone. Other diazo compounds commonly used in azo dye formation may also be employed.

The following examples serve to illustrate the invention:

EXAMPLE 1

Preparation of tartrazine

Sulphanilic acid (1/10 mol) was dissolved in 200 cc. of 2.5% sodium carbonate solution by warming. The solution was cooled to 0° C. and sodium nitrite (1/10 mol) added. The resulting solution was poured into a mixture of 20 cc. concentrated hydrochloric acid and 100 gms. ice. After stirring for ten minutes the suspension was added to a solution of ethyl aceto succinate (1/20 mol) in 40 cc. caustic soda solution (5 N). After stirring for two hours sufficient sodium chloride was added to saturate the solution, whereupon the product precipitated. This was filtered off and hydrolyzed by boiling with 80 cc. of caustic soda solution (2.5 N) for one hour. On cooling the tartrazine separated and was purified by washing with ice-cold water and boiling out with ethyl alcohol.

EXAMPLE 2

Preparation of 4-α-naphthylazo-1-α-naphthyl-3-carbethoxy-5-pyrazolone

A solution of α-naphthylamine (1/10 mol) in 50 cc. 5 N hydrochloric acid was cooled in ice and diazotized by the addition of an aqueous solution of sodium nitrite (1/10 mol). After standing for half an hour the diazonium solution was added, with cooling and stirring, to a solution of ethyl acetosuccinate (1/20 mol) in 50 cc. 20% sodium hydroxide solution. The mixture was allowed to stand overnight to complete the reaction and the dye was then filtered off and washed with water. After recrystallising from ethyl acetate the dye was obtained as small deep maroon crystals. Melting point 170° C. with decomposition.

EXAMPLE 3

Preparation of 4-β-naphthylazo-1-β-naphthyl-3-carbethoxy-5-pyrazolone

Prepared as in Example 2 using β-naphthylamine in place of α-naphthylamine. The product, crystallised from ethyl acetate as small maroon crystals, melting point 216° C. with decomposition.

EXAMPLE 4

Preparation of 4 - p - sulphonamidobenzeneazo-1-p - sulphonamidophenyl - 3 - carbethoxy - 5-pyrazolone Prepared as in Example 2 using p-aminobenzenesulphonamide in place of the α-naphthylamine. The product crystallised from methyl alcohol as small brick-red crystals, melting point 208° C. with decomposition.

EXAMPLE 5

Preparation of dye of the probable formula:

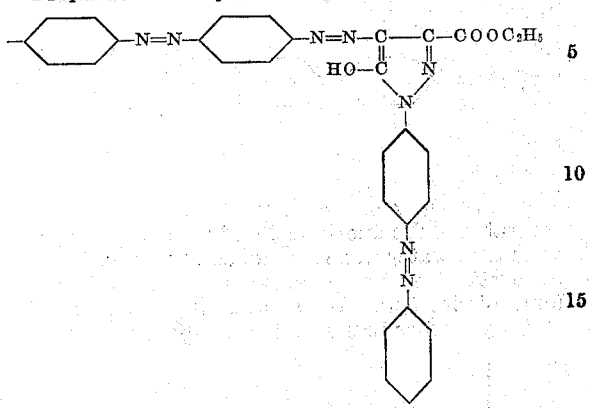

Prepared as in Example 2 using aminoazobenzene in place of α-naphthylamine. Recrystallised from methyl alcohol the product had a melting point 198° C. with decomposition.

EXAMPLE 6

*Preparation of 4-benzeneazo-1-phenyl-3-acetyl-5-pyrazolone*

Prepared as in Example 2 using aniline in place of α-naphthylamine and ethyl ββ-diacetyl propionate (March, Compt. Rend., vol. 130, p. 1193) in place of ethyl acetosuccinate. Recrystallised from ethyl acetate as small brownish-red crystals, melting point 182° C. with decomposition.

EXAMPLE 7

*Preparation of 4-benzeneazo-1-phenyl-3-cyan-5-pyrazolone*

Prepared as in Example 2 using aniline in place of α-naphthylamine and ethyl cyansuccinate (Haller and Barthe, Compt. Rend., vol. 106, page 1413) in place of ethyl acetosuccinate. The product consisted of small orange crystals. Melting point 152° C. with decomposition.

EXAMPLE 8

Preparation of dye of the probable formula:

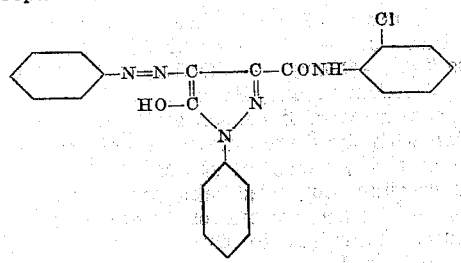

Prepared as in Example 2 using ethyl acetosuccinate o-chloranilide in place of ethyl acetosuccinate, and using aniline in place of α-napthylamine. Recrystallised from ethyl acetate as green crystal. Melting point 164° C. with decomposition.

Ethyl acetosuccinate o-chloranilide is made by reacting equimolecular proportions of sodio acetoacet-o-chloranilide with ethyl chloracetate in ethyl alcohol. The solution is heated until neutral, filtered, excess alcohol distilled off and the residue poured into water. The oily product obtained is dissolved in ether, extracted with 2% sodium carbonate solution and the extracts acidified and filtered. The precipitated compound is recrystallised from benzene, melting point 156° C.

EXAMPLE 9

*Preparation of 4-(1-sulphonaphthaleneazo)-1-(1'-sulphonaphthyl)-3-carbethoxy-5-pyrazolone*

A solution of 2-naphthylamine-1-sulphonic acid sodium salt ($\frac{1}{10}$ mol) and sodium nitrite ($\frac{1}{10}$ mol) in 200 cc. water was poured into a mixture of 100 gm. ice and 20 cc. concentrated hydrochloric acid. After standing for half an hour the suspension of the diazo-sulphonate was added to a solution of ethyl acetosuccinate ($\frac{1}{10}$ mol) in 50 cc. 20% sodium hydroxide solution, with cooling and stirring. The dye was isolated by salting-out. The dye was recrystallised from aqueous spirit as small orange crystals. Melting point about 200° C. with decomposition.

EXAMPLE 10

*Preparation of 4-p-carboxybenzeneazo-1-p-carboxyphenyl-3-carbethoxy-5-pyrazolone*

Sodium nitrite ($\frac{1}{10}$ mol) was added to a solution of p-aminobenzoic acid ($\frac{1}{10}$ mol) in 100 cc. N sodium carbonate solution, and the resultant solution was diazotised by pouring, with stirring, into a mixture of 20 cc. concentrated hydrochloric acid and 100 gm. ice. The diazonium solution was then added with cooling and stirring to a solution of ethyl acetosuccinate ($\frac{1}{20}$ mol) in 50 cc. of 20% sodium hydroxide solution. After standing overnight the solution was acidified and the dye filtered off and washed with water. Recrystallised from ethyl alcohol it consisted of a brick-red powder. Melting point 224° C. with decomposition.

EXAMPLE 11

*Preparation of 4-p-nitrobenzeneazo-1-p-nitrophenyl-3-carboxylic acid-5-pyrazolone* p-Nitraniline ($\frac{1}{10}$ mol) was warmed with 35 cc. concentrated hydrochloric acid and the solution rapidly cooled. The suspension of the p-nitraniline hydrochloride was diazotised by adding a solution of sodium nitrite ($\frac{1}{10}$ mol) in 30 cc. water. The diazonium solution was added to a solution of ethyl acetosuccinate ($\frac{1}{20}$ mol) in 50 cc. 20% sodium hydroxide solution. After standing overnight the brown precipitate was filtered off and washed with water. This was hydrolysed to the free acid by boiling for 15 minutes with 10% sodium hydroxide solution. The solution was filtered from impurity and the dye isolated by acidification followed by filtration. Recrystallised from acetic acid it consisted of orange-yellow crystals. Melting point 260° C. with decomposition.

EXAMPLE 12

Preparation of dye of the probable formula:

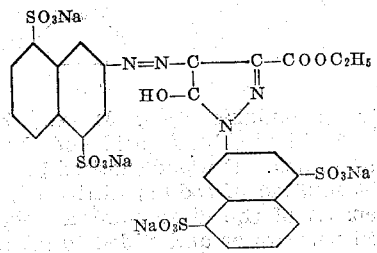

2-naphthylamine-4:8-disulphonic acid sodium salt ($\frac{1}{10}$ mol) was dissolved in 100 cc. water and sodium nitrite ($\frac{1}{10}$ mol) added. Diazotisation was effected by pouring the solution into a mixture of 40 cc. concentrated hydrochloric acid and 200 gm. ice. After standing for half an hour the solution was added to a solution of ethyl acetosuccinate in 100 cc. 20% sodium hydroxide solution. The dye was isolated by salting out and

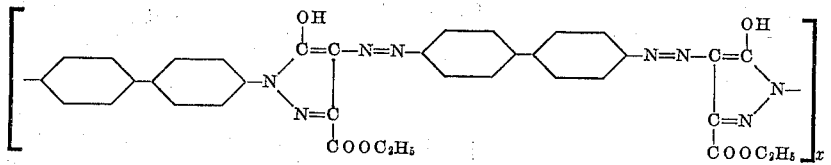

obtained as reddish-brown crystals. Melting point above 260° C.

EXAMPLE 13

Preparation of dye of the probable unit structure:

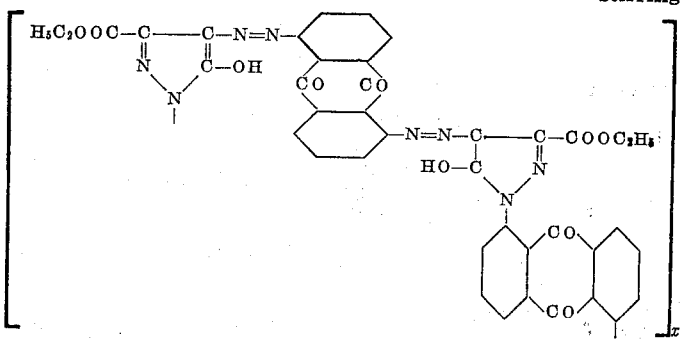

($x$ is an undetermined integer)

1:5-diaminoanthraquinone ($\frac{1}{10}$ mol) was heated with 60 cc. concentrated hydrochloric acid for half an hour. Then the suspension was cooled and tetrazotised by addition of sodium nitrite ($\frac{1}{5}$ mol). The solution was added to a solution of ethyl acetosuccinate ($\frac{1}{10}$ mol) in 120 cc. 20% sodium hydroxide solution. The precipitated dye was filtered off and washed with water. It was purified by boiling out with methyl alcohol, and obtained as a scarlet powder. Melting point 176° C. with decomposition.

EXAMPLE 14

Preparation of dye of the probable formula:

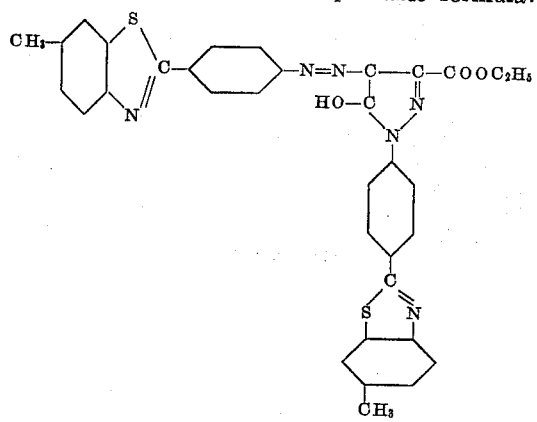

Dehydrothio-p-toluidine ($\frac{1}{10}$ mol) was heated with 70 cc. 5 N hydrochloric acid and the solution rapidly cooled. It was diazotised by adding an aqueous solution of sodium nitrite ($\frac{1}{10}$ mol). The suspension of the diazonium salt obtained was diluted with water and added to a solution of ethyl acetosuccinate ($\frac{1}{20}$ mol) in 65 cc. 20% sodium hydroxide solution. The dye separated from the reaction mixture and was filtered off and washed with water. After drying the dye was obtained as dark crimson crystals with a green reflex. Melting point above 265° C.

EXAMPLE 15

Preparation of dye of the probable unit structure:

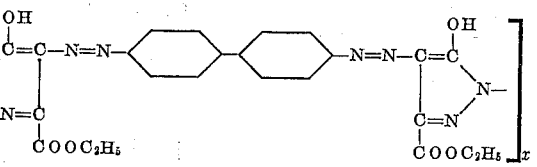

Benzidine ($\frac{1}{20}$ mol) was warmed with 25 cc. concentrated hydrochloric acid and cooled. An equal volume of water was then added and the solution tetrazotised by the addition of a solution of sodium nitrite ($\frac{1}{10}$ mol) in water, with cooling and stirring. After half an hour the diazonium solution was added to a solution of ethyl ethane-$\alpha\alpha\beta$-tricarboxylate ($\frac{1}{20}$ mol) (Bischoff, Annalen, vol. 214, page 38) in 60 cc. 20% sodium hydroxide solution. After standing overnight the crimson azo dye was filtered off and washed with water. Melting point above 300° C.

The same dye may be obtained by substituting ethyl acetosuccinate for the ethyl ethane-$\alpha\alpha\beta$-tricarboxylate.

What we claim is:

1. A process for the production of azo dyestuffs which comprises reacting a diazonium compound with a compound of the formula:

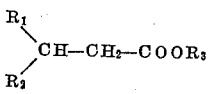

where $R_1$ and $R_2$ are each selected from the class consisting of —CN, —COOH, —COOalkyl, —COalkyl, —COaryl, —CONH$_2$, —CONHalkyl, and —CONHaryl, and $R_3$ is selected from the group consisting of hydrogen and alkyl, the said reaction with the diazonium compound being effected in the presence of strong alkali and the said diazonium compound being present in a proportion of at least two molecular equivalents per molecular equivalent of the compound of the aforesaid formula.

2. A process for the production of azo dyestuffs which comprises reacting a diazonium compound with a compound of the formula:

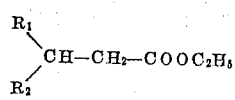

where $R_1$ and $R_2$ are each selected from the class consisting of —CN, —COOH, —COOalkyl, —COalkyl, —COaryl, —CONH$_2$, —CONHalkyl, and —CONHaryl, the said reaction with the diazonium compound being effected in the presence of caustic alkali and the said diazonium compound being present in a proportion of at least two molecular equivalents per molecular equivalent of the compound of the aforesaid formula.

3. A process for the production of azo dyestuffs which comprises reacting a diazonium compound with a compound of the formula:

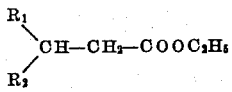

where $R_1$ and $R_2$ are each selected from the class consisting of —CN, —COOH, —COOalkyl, —COalkyl, —COaryl, —CONH$_2$, —CONHalkyl, and —CONHaryl, the said reaction with the diazonium compound being effected in the presence of strong alkali and the said diazonium compound being present in a proportion of at least two molecular equivalents per molecular equivalent of the compound of the aforesaid formula, and purifying the azo dye produced from any by-products of the reaction.

4. A process for the production of azo dyestuffs which comprises reacting a diazonium compound with ethyl acetosuccinate in strong alkaline solution, the diazonium compound being present in a proportion of at least two molecular equivalents per molecular equivalent of the ethyl acetosuccinate.

5. A process for the production of azo dyestuffs which comprises reacting a diazonium compound with ethyl acetosuccinate in caustic alkali, the diazonium compound being present in a proportion of at least two molecular equivalents per molecular equivalent of the ethyl acetosuccinate.

6. A process for the production of azo dyestuffs which comprises reacting a diazonium compound with a compound of the formula:

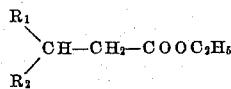

where $R_1$ and $R_2$ are each selected from the class consisting of —CN, —COOH, —COOalkyl, —COalkyl, —COaryl, —CONH$_2$, —CONHalkyl, and —CONHaryl, the said reaction with the diazonium compound being effected in the presence of strong alkali and the said diazonium compound being present in a proportion of at least two molecular equivalents per molecular equivalent of the compound of the aforesaid formula, the said diazonium compound being a tetrazotised aromatic diamine.

JOHN DAVID KENDALL.
DOUGLAS JAMES FRY.

REFERENCES CITED

The following references are of record in the file of this patent:

UNITED STATES PATENTS

| Number | Name | Date |
| --- | --- | --- |
| 1,792,355 | Boeniger | Feb. 10, 1931 |
| 1,880,225 | Zinner | Oct. 4, 1932 |
| 1,951,082 | Bonhote | Mar. 13, 1934 |
| 2,219,712 | Schmid | Oct. 27, 1940 |
| 2,241,795 | Taube | May 13, 1941 |
| 2,366,616 | Harrington | Jan. 2, 1945 |

FOREIGN PATENTS

| Number | Country | Date |
| --- | --- | --- |
| 265,553 | Great Britain | Mar. 20, 1928 |